US 9,965,041 B2

United States Patent
Kurokawa

(10) Patent No.: US 9,965,041 B2
(45) Date of Patent: May 8, 2018

(54) INPUT DEVICE, APPARATUS, INPUT METHOD, AND RECORDING MEDIUM

(71) Applicant: NEC Solution Innovators, Ltd., Tokyo (JP)

(72) Inventor: Takafumi Kurokawa, Tokyo (JP)

(73) Assignee: NEC Solution Innovators, Ltd., Tokyo (JP)

( * ) Notice: Subject to any disclaimer, the term of this patent is extended or adjusted under 35 U.S.C. 154(b) by 76 days.

(21) Appl. No.: 14/422,127

(22) PCT Filed: Aug. 13, 2013

(86) PCT No.: PCT/JP2013/071872
§ 371 (c)(1),
(2) Date: Feb. 17, 2015

(87) PCT Pub. No.: WO2014/027659
PCT Pub. Date: Feb. 20, 2014

(65) Prior Publication Data
US 2015/0193001 A1  Jul. 9, 2015

(30) Foreign Application Priority Data
Aug. 17, 2012  (JP) .................................. 2012-180912

(51) Int. Cl.
*G06F 3/01* (2006.01)
*G06K 9/00* (2006.01)
(Continued)

(52) U.S. Cl.
CPC ................ *G06F 3/017* (2013.01); *G06F 3/01* (2013.01); *G06K 9/00335* (2013.01);
(Continued)

(58) Field of Classification Search
CPC ....... G06F 3/017; G06F 3/01; G06K 9/00355; G06T 7/2033; G06T 7/20; G06T 7/606;
(Continued)

(56) References Cited

U.S. PATENT DOCUMENTS

2007/0124702 A1   5/2007  Morizaki
2009/0219290 A1*  9/2009  Kakie ................. G06F 3/03545
                                                345/427
(Continued)

FOREIGN PATENT DOCUMENTS

CA      2591808 A1    1/2009
CN    102129290 A     7/2011
(Continued)

OTHER PUBLICATIONS

International Search Report corresponding to PCT/JP2013/071872 dated Nov. 19, 2013 (3 pages).
(Continued)

*Primary Examiner* — Amare Mengistu
*Assistant Examiner* — Jennifer Zubajlo
(74) *Attorney, Agent, or Firm* — Wilmer Cutler Pickering Hale and Dorr LLP

(57) ABSTRACT

An image analyzer (12) of an input device (1) analyzes images acquired by an image acquirer (11) and extracts image areas representing a user's body parts. A coordinate extractor (13) extracts, from the image areas representing body parts, coordinates of feature points on body parts, and generates body motion information (200*d*) representing trajectories of motions of body parts. When determined that predetermined body motions are performed based on the body motion information (200*d*), a body motion determiner (15) detects center coordinates of trajectory shapes of the predetermined body motions. A start coordinate detector (16) detects start coordinates of the predetermined body (Continued)

motions based on the body motion information (200*d*). A command generator (17) generates, based on positional relationships between points defined by the center coordinates and points defined by the start coordinates, command information (100*a*) representing commands and transmits generated commands information (100*a*) to a target device (100).

10 Claims, 8 Drawing Sheets

(51) Int. Cl.
*G06T 7/20* (2017.01)
*G06T 7/246* (2017.01)
*G06T 7/66* (2017.01)

(52) U.S. Cl.
CPC ............ *G06K 9/00355* (2013.01); *G06T 7/20* (2013.01); *G06T 7/246* (2017.01); *G06T 7/66* (2017.01); *G06T 2207/20076* (2013.01); *G06T 2207/30196* (2013.01); *G06T 2207/30241* (2013.01)

(58) Field of Classification Search
CPC . G06T 2207/30196; G06T 2207/30241; G06T 2207/20076
See application file for complete search history.

(56) References Cited

U.S. PATENT DOCUMENTS

| | | | |
|---|---|---|---|
| 2010/0103106 A1* | 4/2010 | Chui | G06F 3/017 345/166 |
| 2010/0315438 A1* | 12/2010 | Horodezky | G06F 3/0481 345/661 |
| 2011/0026765 A1* | 2/2011 | Ivanich | H04N 5/4403 382/103 |
| 2011/0210947 A1* | 9/2011 | Kawaguchi | G06F 3/0304 345/175 |
| 2011/0260033 A1* | 10/2011 | Steffensen | G01C 15/002 250/203.1 |
| 2012/0159330 A1* | 6/2012 | Jeong | G06F 3/017 715/716 |
| 2016/0170479 A1 | 6/2016 | Fukuchi et al. | |

FOREIGN PATENT DOCUMENTS

| | | | |
|---|---|---|---|
| CN | 102171640 A | | 8/2011 |
| JP | 11-149563 A | | 6/1999 |
| JP | 11149563 A | * | 6/1999 |
| JP | 2007-034525 A | | 2/2007 |
| JP | 2007-172577 A | | 7/2007 |
| WO | WO-2011/133731 A2 | | 10/2011 |

OTHER PUBLICATIONS

Extended European Search Report issued in corresponding European Patent Application No. 13879456.5, dated Oct. 7, 2016, 8 pages.
Chinese Office Action issued by the Patent Office of the People's Republic of China for Application No. 2013800440024 dated Jul. 29, 2016 (18 pages).
Canadian Office Action issued by the Canadian Intellectual Property Office for Application No. 2,882,005 dated May 3, 2016 (5 pages).
Chinese Office Action issued by The Patent Office of the People's Republic of China for Chinese Application No. 201380044002.4 dated Feb. 2, 2018 (17 pages).

* cited by examiner

FIG.6

| POSITIONAL RELATIONSHIP | COMMAND |
|---|---|
| START COORDINATE S LOCATED BELOW CENTER OF GRAVITY COORDINATE G | INCREASE AUDIO VOLUME |
| START COORDINATE S LOCATED ON THE LEFT SIDE OF CENTER OF GRAVITY COORDINATE G | FORWARD CHANNEL |
| START COORDINATE S LOCATED ON THE RIGHT SIDE OF CENTER OF GRAVITY COORDINATE G | REDUCE AUDIO VOLUME |
| START COORDINATE S LOCATED ABOVE CENTER OF GRAVITY COORDINATE G | RETURN CHANNEL |

FIG.7

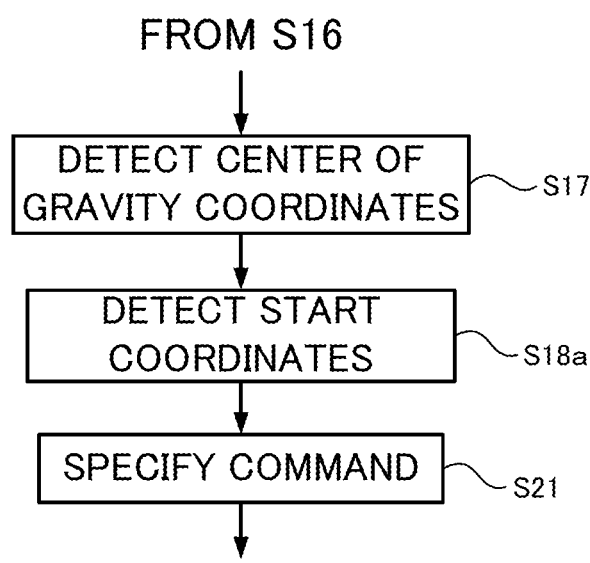

INPUT DEVICE, APPARATUS, INPUT METHOD, AND RECORDING MEDIUM

CROSS-REFERENCE TO RELATED APPLICATIONS

This application is a national stage application of International Application No. PCT/JP2013/071872 entitled "Input Device, Apparatus, Input Method, and Recording Medium," filed on Aug. 13, 2013, which claims the benefit of the priority of Japanese Patent Application No. 2012-180912, filed on Aug. 17, 2012, the disclosures of each of which are hereby incorporated by reference in their entirety.

TECHNICAL FIELD

The present disclosure relates to an input apparatus, an device, an input method, and a non-transitory recording medium that generate information for controlling devices or executing functions of the devices based on a user's motions.

BACKGROUND ART

Inputting technologies for determining a user's gesture and inputting a command and data that are associated with the determined gesture have been known.

Patent Literature 1 discloses, for example, an input apparatus that analyzes an imaged image of an operator and allows the operator to input, to a device, information expressed by a hand motion of the operator. This input apparatus is capable of detecting and recognizing a circular trajectory motion of a hand.

In addition, Patent Literature 2 discloses an apparatus and a method that allow input based on a hand motion and the like of a user.

CITATION LIST

Patent Literature

Patent Literature 1: Unexamined Japanese Patent Application Kokai Publication No. 2007-172577
Patent Literature 2: Unexamined Japanese Patent Application Kokai Publication No. 2007-034525

SUMMARY OF INVENTION

Technical Problem

According to the technologies disclosed in Patent Literatures 1 and 2, a single command is allocated to a single shape of a hand motion trajectory. Thus, the greater the number of commands becomes, the greater the number of patterns of body motion trajectory becomes, making the inputting motions more complex and complicated. In addition, a shape pattern recognition rate decreases when the number of trajectory shape patterns of the body motions increases.

The present disclosure has been made in view of the aforementioned circumstances, and an objective of the present disclosure is to allow input of numerous commands by simple operations.

Another objective of the present disclosure is to allow allocation of relatively large number of commands to relatively small number of trajectory shapes.

Solution to Problem

In accordance with a first aspect of the present disclosure, there is provided an input apparatus that generates information for controlling devices based on a user's motions comprising:

an image acquiring means that acquires images;

an image analyzing means that analyzes the images acquired by the image acquiring means and extracts an image areas representing moving objects that are moved by the user;

a coordinate extracting means that extracts, from the image areas representing the moving objects extracted by the image analyzing means, coordinates of predefined points of the moving objects and generates motion information representing trajectories of motions of the moving objects;

a motion determining means that determines, based on the motion information, whether or not predetermined motions are performed and detects, when determined that the predetermined motion are performed, center coordinates of shapes formed by trajectories of the predetermined motions;

a coordinate detecting means that detects, based on the motion information, specific coordinates on the trajectories of the predetermined motions;

an information generating means that generates, based on positional relationships between points defined by the center coordinates and points defined by the specific coordinates, information for controlling the devices; and a memory that stores an information correspondence table that associates the positional relationships between the points defined by the center coordinates and the points defined by the specific coordinates with the information for controlling the devices, wherein the information generator checks the center coordinates detected by the motion determiner and the specific coordinates detected by the coordinate detector with the information correspondence table to specify the corresponding information and generates the information that is specified.

In accordance with a second aspect of the present disclosure, there is provided a device that includes a function unit for executing functions and generates information for executing the functions based on a user's motions comprising:

an image acquiring means that acquires images;

an image analyzing means that analyzes the images acquired by the image acquiring means and extracts image areas representing moving objects moved by the user;

a coordinate extracting means that extracts, from the image areas representing the moving objects extracted by the image analyzing means, coordinates of predefined points of the moving objects and generates motion information representing trajectories of a motions of the moving objects;

a motion determining means that determines, based on the motion information, whether or not predetermined motions are performed and detects, when determined that the predetermined motions are performed, center coordinates of shapes formed by trajectories of the predetermined motions;

a coordinate detecting means that detects, based on the motion information, specific coordinates on the trajectories of the predetermined motions;

an information generating means that generates the information for executing the functions based on positional relationships between points defined by the center coordinates and points defined by the specific coordinates; and a memory that stores an information correspondence table that associates the positional relationships between the points defined by the center coordinates and the points defined by the specific coordinates with the information for controlling the devices, wherein the information generator checks the center coordinates detected by the motion determiner and the specific coordinates detected by the coordinate detector with the information correspondence table to specify the corresponding information and generates the information that is specified.

In accordance with a third aspect of the present disclosure, there is provided an input method comprising:

an image acquiring step for acquiring images;

an image analyzing step for analyzing the images acquired in the image acquiring step and extracting image areas representing moving objects that are moved by a user;

a coordinate extracting step for extracting, from the image areas representing the moving objects extracted in the image analyzing step, coordinates of predefined points of the moving objects and generating motion information representing trajectories of motions of the moving objects;

a motion determining step for determining, based on the motion information, whether or not predetermined motions are performed and detects, when determined that the predetermined motions are performed, center coordinates of shapes formed by trajectories of the predetermined motions;

a coordinate detecting step for detecting, based on the motion information, specific coordinates on the trajectories of the predetermined motions;

an information generating step for generating, based on positional relationships between points defined by the center coordinates and points defined by the specific coordinates, information for controlling devices; and a memory that stores an information correspondence table that associates the positional relationships between the points defined by the center coordinates and the points defined by the specific coordinates with the information for controlling the devices, wherein the information generator checks the center coordinates detected by the motion determiner and the specific coordinates detected by the coordinate detector with the information correspondence table to specify the corresponding information and generates the information that is specified.

In accordance with a fourth aspect of the present disclosure, there is provided a non-transitory computer readable recording medium characterized by storing a program for causing a computer to function as:

an image acquiring means that acquires images;

an image analyzing means that analyzes the images acquired by the image acquiring means and extracts image areas representing moving objects that are moved by a user;

a coordinate extracting means that extracts, from the image areas representing the moving objects extracted by the image analyzing means, coordinates of predefined points of the moving objects and generates motion information representing trajectories of motions of the moving objects;

a motion determining means that determines, based on the motion information, whether or not predetermined motion are performed and detects, when determined that the predetermined motions are performed, center coordinates of shapes formed by trajectories of the predetermined motions;

a coordinate detecting means that detects, based on the motion information, specific coordinates on the trajectories of the predetermined motions;

an information generating means that generates, based on positional relationships between points defined by the center coordinates and points defined by the specific coordinates, information for controlling devices; and a memory that stores an information correspondence table that associates the positional relationships between the points defined by the center coordinates and the points defined by the specific coordinates with the information for controlling the devices, wherein the information generator checks the center coordinates detected by the motion determiner and the specific coordinates detected by the coordinate detector with the information correspondence table to specify the corresponding information and generates the information that is specified.

Advantageous Effects of Invention

The present disclosure relates to information inputting technology that allows operations of devices based on a user's motions by utilizing images and is capable of allocating multiple pieces of information to a single shape formed by a trajectory of a user's motion. Thus, it is unnecessary for a user to memorize each shapes formed by trajectories of motions representing each pieces of information, thereby reducing user's burden of memorizing shapes formed by trajectories.

BRIEF DESCRIPTION OF DRAWINGS

FIG. 6 illustrates an example command correspondence table according to the embodiment;

FIG. 7 illustrates a modified example of a part of the flowchart illustrated in FIG. 2;

DESCRIPTION OF EMBODIMENTS

Hereinafter, an embodiment of the present disclosure will be described.

Figure 1:
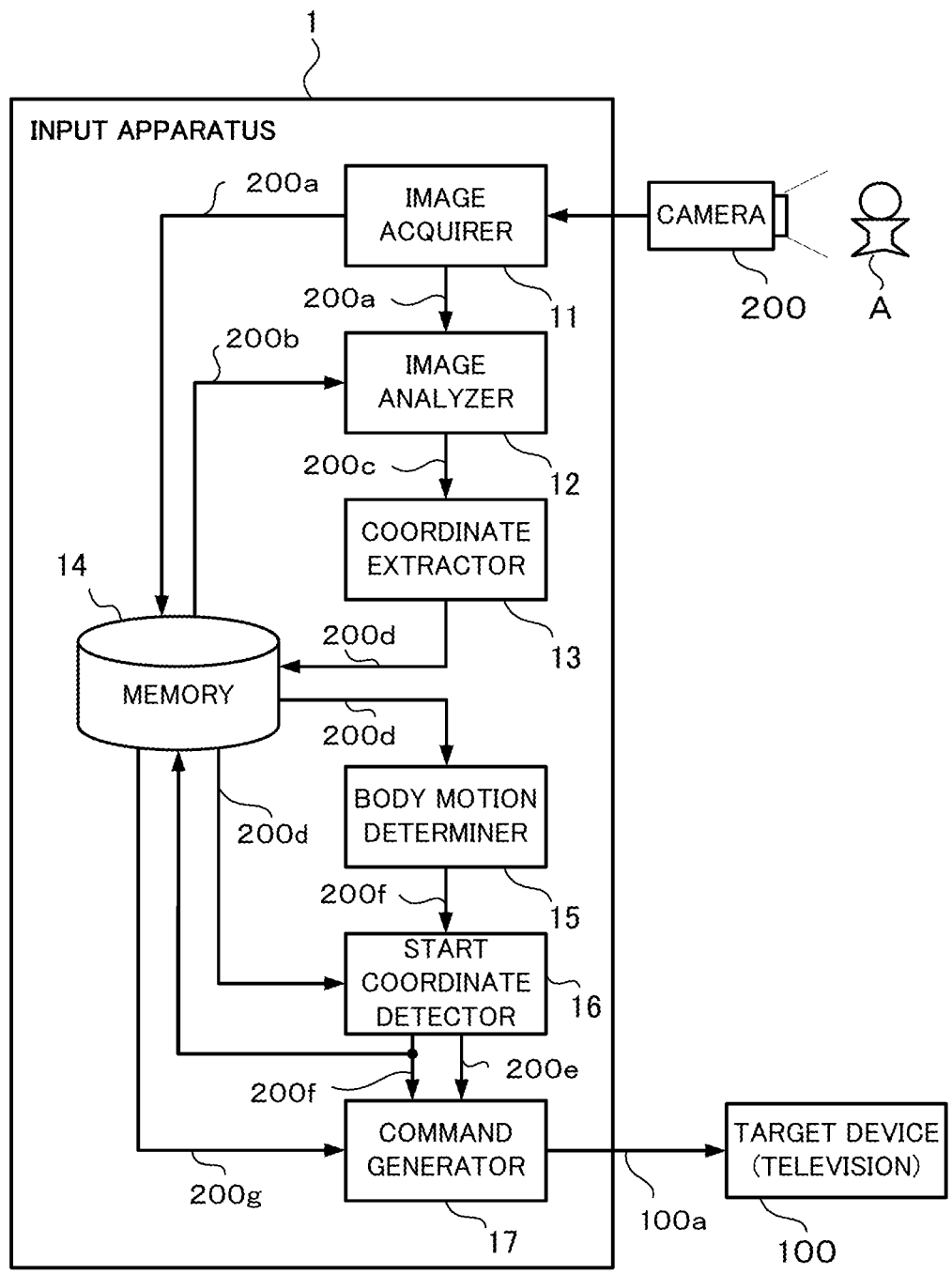
FIG. 1 is a block diagram illustrating an example structure of an input apparatus according to an embodiment of the present disclosure.

FIG. 1 is a block diagram illustrating an example structure of an input apparatus according to the embodiment of the present disclosure along with a camera and a target device.

Figure 4:
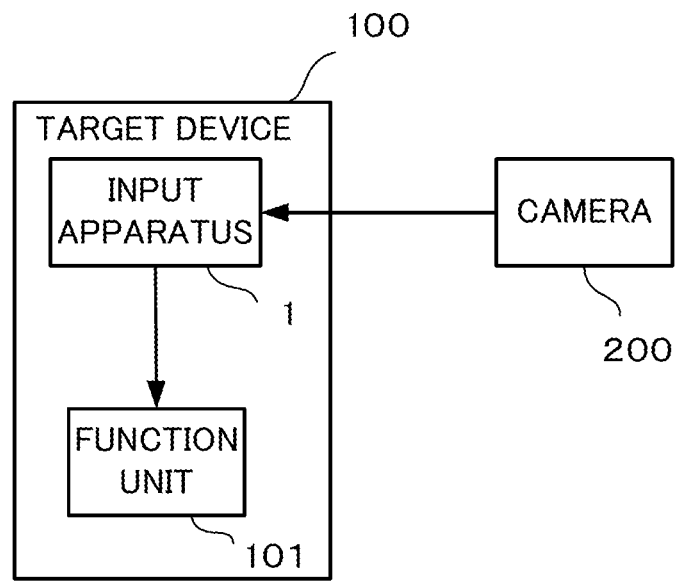
FIG. 4 illustrates an example arrangement that is dissimilar to that of the input apparatus and a target device illustrated in FIG. 1.

An input apparatus 1 according to the embodiment includes an image acquirer 11, an image analyzer 12, a coordinate extractor 13, a memory 14, a body motion determiner 15, a start coordinate detector 16, and a command generator 17. The input apparatus 1 generates command information 100a that represents commands for controlling a target device 100, and transmits the command information to the target device 100 such as a television. Note that, as shown in FIG. 4, the input apparatus 1 may be built in the target device 100.

Figure 5:
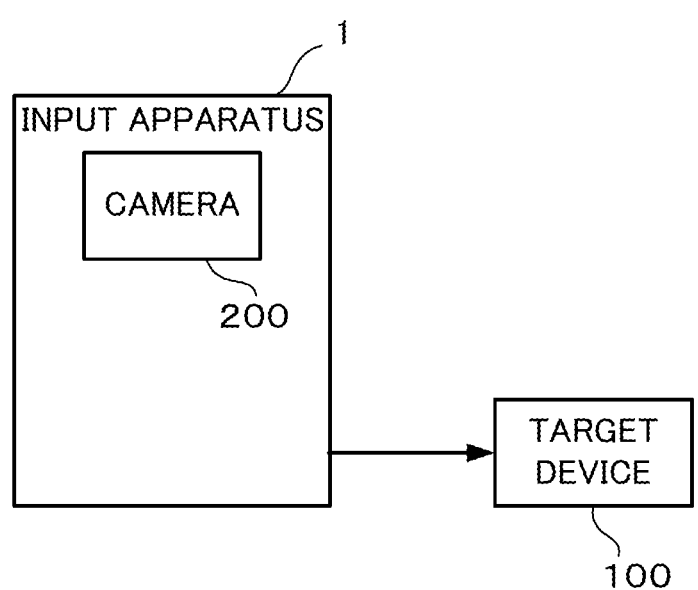
FIG. 5 illustrates an example arrangement that is dissimilar to that of the input apparatus and a camera illustrated in FIG. 1.

The image acquirer 11 is connected to a camera 200 and receives image information 200a of an image A imaged by the camera 200. The camera 200 has a fixed direction so that a user can recognize directions in which images are imaged. The image acquirer 11 sends the acquired image information 200a to the image analyzer 12. Additionally, the image acquirer 11 stores the acquired image information 200a in the memory 14. Note that, as shown in FIG. 5, the camera 200 may be built in the input apparatus 1. In this case, also, the image acquirer 11 acquires the image information 200a of the image A imaged by the camera 200.

The image analyzer 12 analyzes the image information 200a received from the image acquirer 11 and image information 200b of past images stored in the memory 14, and extracts image areas (hereinafter, referred to as the motion areas) that represent areas that moved between the time point at which the image information 200b is acquired and the time point at which the image information 200a is acquired. The image analyzer 12 detects hands from the motion areas by pattern matching and the like, to extract image areas representing hands. The image analyzer 12 sends, to the coordinate extractor 13, hand area information 200c indicating extracted hand image areas.

The extraction method for the motion areas is not limited to this method. When, for example, a camera is fixed and objects other than the user are standing still, the motion areas may be extracted by storing in advance images in which the user is not present (motionless images) and comparing acquired images with them. Alternatively, acquired images may be compared along time axis so that unmatched coordinates in the successive images may be extracted as the motion areas. Further, the image analyzer 12 may detect hands from images by the pattern matching and the like, in order to directly extract the hand image areas.

The coordinate extractor 13 extracts coordinates of feature points from the hand image areas that are indicated by the hand area information 200c received from the image analyzer 12. In this embodiment, the coordinates of the feature points are coordinates that indicate centers of gravity of hands. The coordinate extractor 13 calculates quantities of motions and directions of hand motions based on extracted coordinates that represent centers of gravity of hands, and generates body motion information 200d indicating hand motions. The coordinate extractor 13 stores generated body motion information 200d in the memory 14.

Note that the coordinates of the feature points are not limited to the coordinates indicating the centers of gravity of hands, and may be coordinates of, for example, a tip of raised one finger, intersections between center lines of vertical length and center lines of horizontal length, and other such specific coordinates included in the image areas of the hands.

The memory 14 sequentially stores pieces of image information 200a that are received from the image acquirer 11 at each predetermined time interval such as every ten seconds. In addition, the memory 14 stores the body motion information 200d received from the coordinate extractor 13.

The body motion determiner 15 determines whether or not circle gestures has been performed based on the hand motions indicated by the body motion information 200d stored in the memory 14. The circle gestures are body motions of drawing substantially circular shapes with hands. Whether or not it is a circle gesture can be determined based on whether the hand motion indicated by the body motion information 200d matches circular trajectory patterns that are stored in advance.

Note that the body motions determined by the body motion determiner 15 are not limited to the circle gestures and any body motion whose trajectory shape allows detection of center coordinates, such as body motions whose trajectory shape form circular arcs, can be employed. In particular, when body motions have closed trajectory shapes such as circles, triangles, and rectangles, or have non-closed trajectory shapes in which start points of the body motions and end points of the body motion are in close proximity to each other, such body motions allow the user to easily recognize the positional relationships between the start coordinates and the center coordinates. The center coordinates are coordinates of points located at the substantial centers of the body motions' trajectory shape such as centers of gravity, inner centers, circumcenters, midpoints, and intersections between center lines of vertical length and center lines of horizontal length.

When determined that the circle gestures are performed, the body motion determiner 15 detects the center coordinates of the trajectory shapes of the circle gestures based on quantities of hand motions and directions of hand motions indicated by the body motion information 200d. In this embodiment, the center coordinates are coordinates that represent centers of gravity of circles. The body motion determiner 15 sends, to the start coordinate detector 16, center of gravity information 200e indicating the coordinates of the centers of gravity of the detected circles.

The start coordinate detector 16 detects, upon receiving the center of gravity information 200e from the body motion determiner 15, start coordinates of the circle gestures based on the hand motions indicated by the body motion information 200d stored in the memory 14. The start coordinate detector 16 sends, to the command generator 17, the start coordinate information 200f indicating the start coordinates of the detected circle gestures and the center of gravity 200e.

The start coordinate detector 16 stores, in the memory 14, the start coordinate information 200f indicating the start coordinates of the detected circle gestures. When it was unable to detect the start coordinates of the circle gestures, start coordinate information 200f indicating the start coordinates of the previously detected circle gestures may be utilized.

The memory 14 stores in advance command correspondence table information 200g representing a command correspondence table that associates the positional relationships between the start coordinates and the centers of gravity coordinates with command information that indicates commands for controlling the target device 100.

The command generator 17 checks the positional relationships between the start coordinates indicated by the start coordinate information 200f received from the start coordinate detector 16 and the centers of gravity coordinates indicated by the center of gravity information 200e with the command correspondence table represented by the command correspondence table information 200g stored in the memory 14 to specify the commands that are input. The command generator 17 generates the command information 100a indicating the specified commands and transmits this command information 100a to the target device 100. When the input apparatus 1 is built in the device 100, the command generator 17 sends the command information 100a to a function unit 101 that executes functions of the device 100.

When the image analyzer 12 and other components do not utilize the image information 200b representing the past images and the body motion information 200d both stored in the memory 14, the command generator 17 may, upon transmitting the command information 100a to the target device 100, delete the image information 200a representing images and the body motion information 200d that are stored in the memory 14.

When the body motions that are subject to determination by the body motion determiner 15 are body motions forming closed trajectory shapes, the body motion determiner 15 may further detect directions of the body motion trajectories based on the hand motions indicated by the body motion information 200d. In this scenario, the command correspondence table associates the positional relationships between the start coordinates and the center of gravity, the directions of the body motion trajectories, and commands for controlling the target device 100 in association with one another. The command generator 17 checks each of the start coordinates represented by the start coordinate information 200f received from the start coordinate detector 16, the center of gravity coordinates represented by the center of gravity information 200e, and the directions of body motion trajectories with the command correspondence table that is represented by the command correspondence table information 200g stored in the memory 14, thereby specifying the commands that have been input. Hence, by adding the directions of the body motion trajectories as the elements associated with the commands, the number of combinations can be increased and still greater number of commands can be allocated to a single trajectory shape of body motions.

Figure 2:
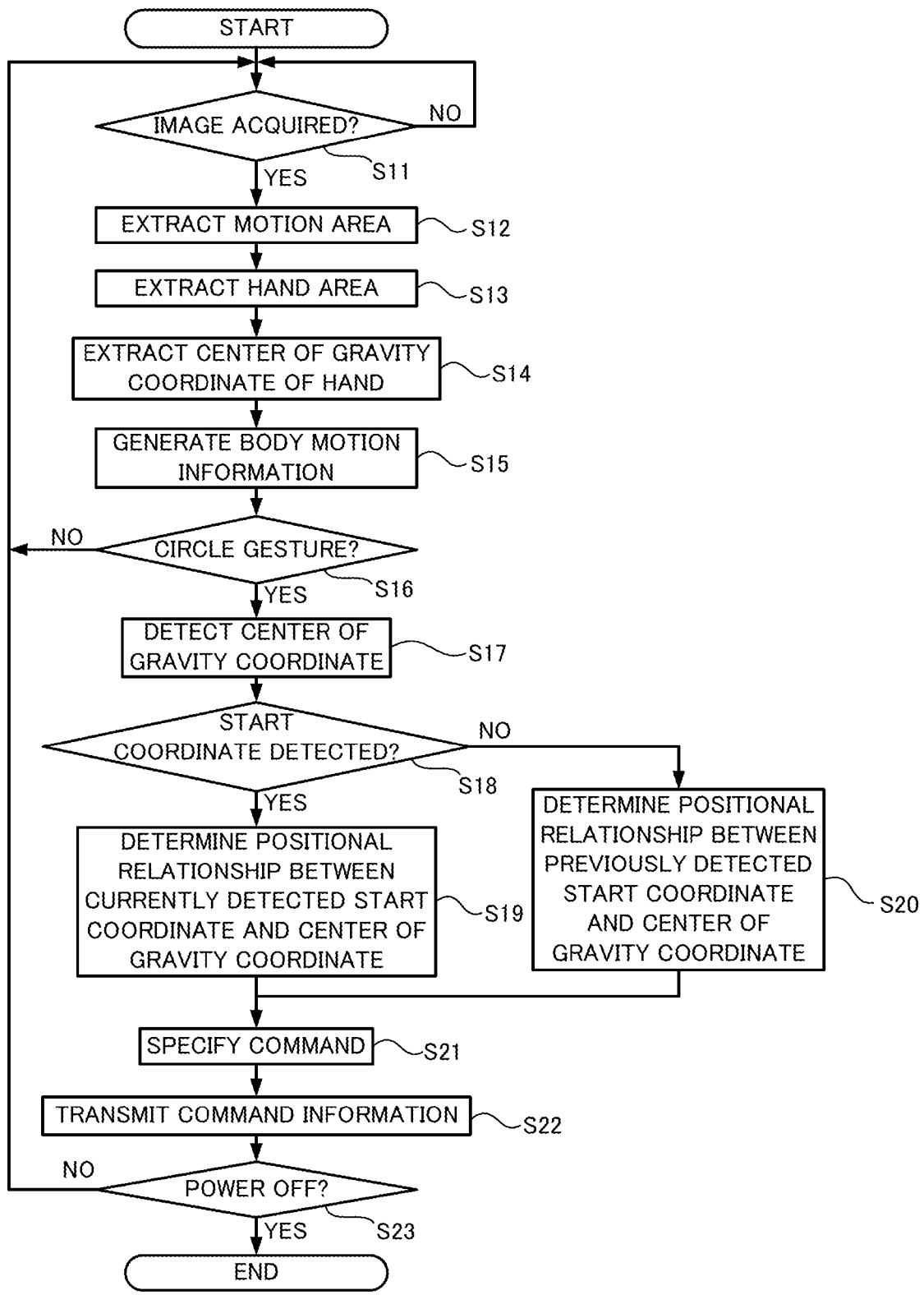
FIG. 2 is a flowchart illustrating an example operation of the input apparatus according to the embodiment.

FIG. 2 is a flowchart showing an example operation of the input apparatus according to this embodiment. A process shown in FIG. 2 is initiated when power of the input apparatus 1 is turned on.

When image acquirer 11 acquires images imaged by the camera 200 (step S11; YES), the image analyzer 12 compares the image information 200a that represents the images received from the image acquirer 11 and the image information 200b that represents the past images stored in the memory 14 to extract motion areas (step S12). When no image imaged by the camera 200 is acquired (step S11; NO), the process in S11 is repeated.

When, for example, the camera 200 including a human sensor (not shown) capable of detecting human motions detects human motions, the camera 200 is activated and initiates imaging, and the image acquirer 11 acquires images imaged by the camera. Alternatively, when the user activates the camera 200, the camera 200 initiates the imaging, and the image acquirer 11 acquires images imaged by the camera 200. Further, the image acquirer 11 may continually acquire the images while the power of the input apparatus 1 is on.

The image analyzer 12 detects hand from the motion areas, and extracts the hand image area (step S13). The image analyzer 12 sends, to the coordinate extractor 13, the hand area information 200c representing the extracted hand image areas. The coordinate extractor 13 extracts coordinates indicating the center of gravity of the hand from the hand image areas represented by the hand area information 200c received from the image analyzer 12 (step S14).

The coordinate extractor 13 calculates quantities and directions of hand motion based on the extracted coordinates indicting the center of gravity of the hand and generates the body motion information 200d representing these calculated values (step S15). The coordinate extractor 13 stores the generated body motion information 200d in the memory 14.

The body motion determiner 15 determines, based on the quantity and the direction of hand motion that are represented by the body motion information 200d stored in the memory 14, whether or not the hand motion is a circle gesture (step S16). When determined that the hand motion is not the circle gesture (step S16; NO), the process is returned to the step S11, and the processes in the steps S11 to S16 are repeated.

When it is determined that the hand motion is the circle gesture (step S16; YES), the body motion determiner 15 further detects coordinates of centers of gravity of the circle drawn by the circle gesture based on the quantity and the direction of the hand motion that are represented by the body motion information 200d stored in the memory 14 (step S17). The body motion determiner 15 sends, to the start coordinate detector 16, the center of gravity coordinate information 200e that represents the center of gravity coordinate of the extracted circle.

The start coordinate detector 16 detects, upon receiving the center of gravity coordinate information 200e from the body motion determiner 15, the start coordinate of the circle gesture based on the hand motion represented by the body motion information 200d stored in the memory 14 (step S18).

When the start coordinate of the circle gesture is detected (step S18; YES), the start coordinate detector 16 sends, to the command generator 17, the start coordinate information 200f representing the currently detected start coordinates of the circle gesture, and the center of gravity coordinate information 200e. The start coordinate detector 16 stores the detected start coordinate of the circle gesture in the memory 14. The command generator 17 compares position defined by the currently detected start coordinate of the circle gesture with position defined by the center of gravity coordinate of the circle based on the start coordinate information 200f and the center of gravity coordinate information 200e, and determines the positional relationship between the point defined by start coordinate and point defined by the center of gravity coordinate (step S19).

When the start coordinate of the circle gesture is not detected (step S18; NO), the start coordinate detector 16 sends, to the command generator 17, the start coordinate information 200f representing the previously detected start coordinates of the circle gestures and the center of gravity coordinate information 200e. The command generator 17 compares, based on the start coordinate information 200f and the center of gravity coordinate information 200e, positions defined by the previously detected start coordinates of the circle gestures with positions defined by the center of gravity coordinates of the circles to determine the positional relationships between points defined by the start coordinates and points defined by the center of gravity coordinates (step S20).

The command generator 17 checks the positional relationship between the start coordinates of circle gesture and the center of gravity coordinate of circle with the command correspondence table represented by the command correspondence table information 200g stored in the memory 14, and specifies what command has been input (step S21). The command generator 17 generates command information that represents the specified commands, and sends the command information to the target device 100 (step S22).

If the power of the input apparatus 1 is not turned off (step S23; NO), the process returns to the step S11, and the processes in the steps S11 to S22 are repeated. If the power of the input device 1 is turned off (step S23; YES), this process is terminated.

When no start coordinate of the circle gesture is detected (step S18; NO), the process may progress to the step S23. In this case, it is unnecessary for the start coordinate detector 16 to store the detected start coordinate of circle gesture in the memory 14.

FIGS. 3A to 3D are diagrams illustrating example circle gestures according to this embodiment. Even if some body motions are to draw same circular trajectory shapes, the input apparatus 1 can distinguish those body motions with one another based on the positional relationships between the center of gravity coordinates G of the circles and the start coordinates S of the circle gestures CG. The examples in FIGS. 3A to 3D respectively show a circle gesture CG having the start coordinates S located below the center of gravity coordinates G, a circle gesture CG having the start coordinates S located on the left side of the center of gravity coordinates G, a circle gesture CG having the start coordinates S located above the center of gravity coordinates G, and a circle gesture CG having the start coordinates S located on the right side of the center of gravity coordinates G.

FIG. 6 shows an example command correspondence table according to this embodiment. FIG. 6 shows an example case in which a television is the target device 100. The four circle gestures CG shown in FIGS. 3A to 3D are associated with commands for operating the television, such as "increase audio volume", "forward channel", "reduce audio volume", and "return channel", respectively.

Figure 3A:
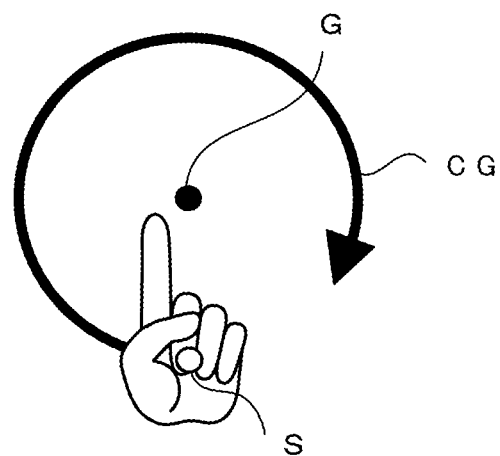
FIG. 3A is a diagram illustrating an example circle gesture of the embodiment.
Figure 3B:
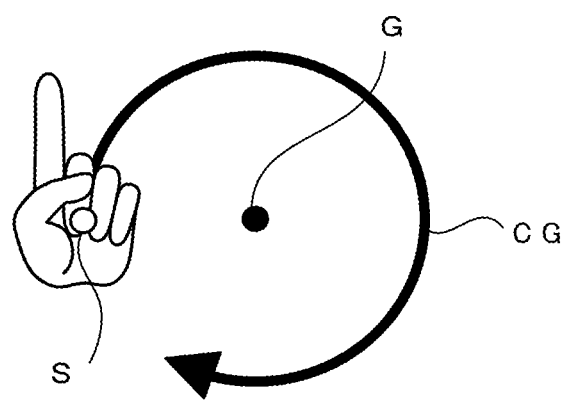
FIG. 3B is a diagram illustrating an example circle gesture of the embodiment.
Figure 3C:
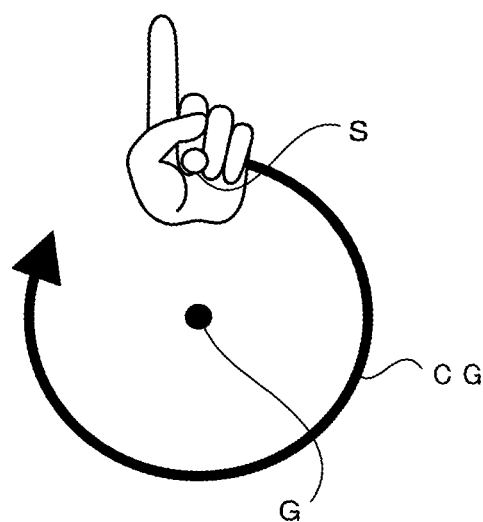
FIG. 3C is a diagram illustrating an example circle gesture of the embodiment.
Figure 3D:
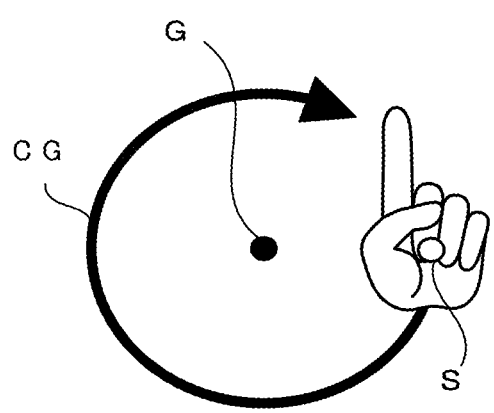
FIG. 3D is a diagram illustrating an example circle gesture of the embodiment.

When, for example, the user desires to forward the channel to the next channel, the circle gesture CG shown in FIG. 3B that includes the start coordinates S located on the left side of the center of gravity coordinates G may be performed. This operation will be described with reference to the flowchart of FIG. 2.

When the user performs the circle gesture CG with the start coordinates S located on the left side of the center of gravity coordinates G, the image acquirer 11 acquires images imaged by the camera 200 for a certain period of time such as ten seconds (step S11; YES), and stores the acquired images in the memory 14. The image analyzer 12 compares the image information 200a representing the images received from the image acquirer 11 with the image information 200b representing the images that are received prior to receiving the images represented by the image information 200a, in other words, past images that has already been stored in the memory 14, and the image analyzer 12 extracts the motion areas (step S12). The image analyzer 12 detects hands from the motion areas, and extracts the hand area information 200c representing the image areas representing the hands (step S13).

The coordinate extractor 13 extracts coordinates representing the center of gravity of the hands from the hand image areas represented by the hand area information 200c extracted by the image analyzer 12 (step S14), and generates the body motion information 200d representing the motions of hands (step S15). The body motion determiner 15 determines, based on the body motion information 200d, that the hand motions are the circle gestures (step S16; YES) and detects the center of gravity coordinates G of the circles of the circle gestures CG (step S17).

The start coordinate detector 16 detects the start coordinates S of the circle gestures CG based on the body motion information 200d (step S18; YES). The command generator 17 compares the positions of the currently detected start coordinates S of the circle gestures CG with those of the center of gravity coordinates G of the circles (step S19), and checks the positional relationships that is "start coordinate S is located on the left side of the center of gravity coordinates G" with the command correspondence table shown in FIG. 6, and specifies a command, "forward channel" (step S21). The command generator 17 generates command information 100a indicating the command "forward channel" and transmits it to the television (step S22).

When it receives the command information 100a indicating the command "forward channel", the television 100 executes the command "forward channel". As such, the user can forward the channel of the television 100 to the next channel by remote operation.

The input apparatus 1 according to the embodiment relates to command inputting technology that enables remote operations of the devices 100 based on the user's body motions by utilizing camera images and can distinguish one body motion from other body motions based on the positional relationships between points defined by the coordinates representing the center positions of the trajectory shapes of the body motions and points defined by the coordinates representing the start positions of the body motions. Hence, by changing the positional relationships, multiple commands can be allocated to single trajectory shape of body motions.

While, in this embodiment, the hand-moving body motions are recognized as the user's body motions that do not directly control an operation unit of the devices 100, the present disclosure is not limited to this embodiment. A user's head or face, for example, may be recognized so that head shaking, nodding, head rotating, and other body motions may be recognized, and in the same way, the body motions performed by feet may be recognized. Furthermore, body motions performed by the whole body may be recognized.

Modified Example

The input apparatus 1 according to the embodiment described above utilizes, as the start coordinates, coordinates representing the start points of body motions that are detected by the start coordinate detector 16. Alternatively, coordinates representing the center of gravity of hands extracted by the coordinate extractor 13 may be utilized as the start coordinates. In this case, instead of executing the processes in the steps S18 to S20 shown in FIG. 2, the start coordinate detector 16 detects, based on the body motion information stored in the memory 14, coordinates of feature points extracted by the coordinate extractor 13 as start coordinates of the circle gestures, as is indicated by the step S18a shown in FIG. 7.

Figure 8:
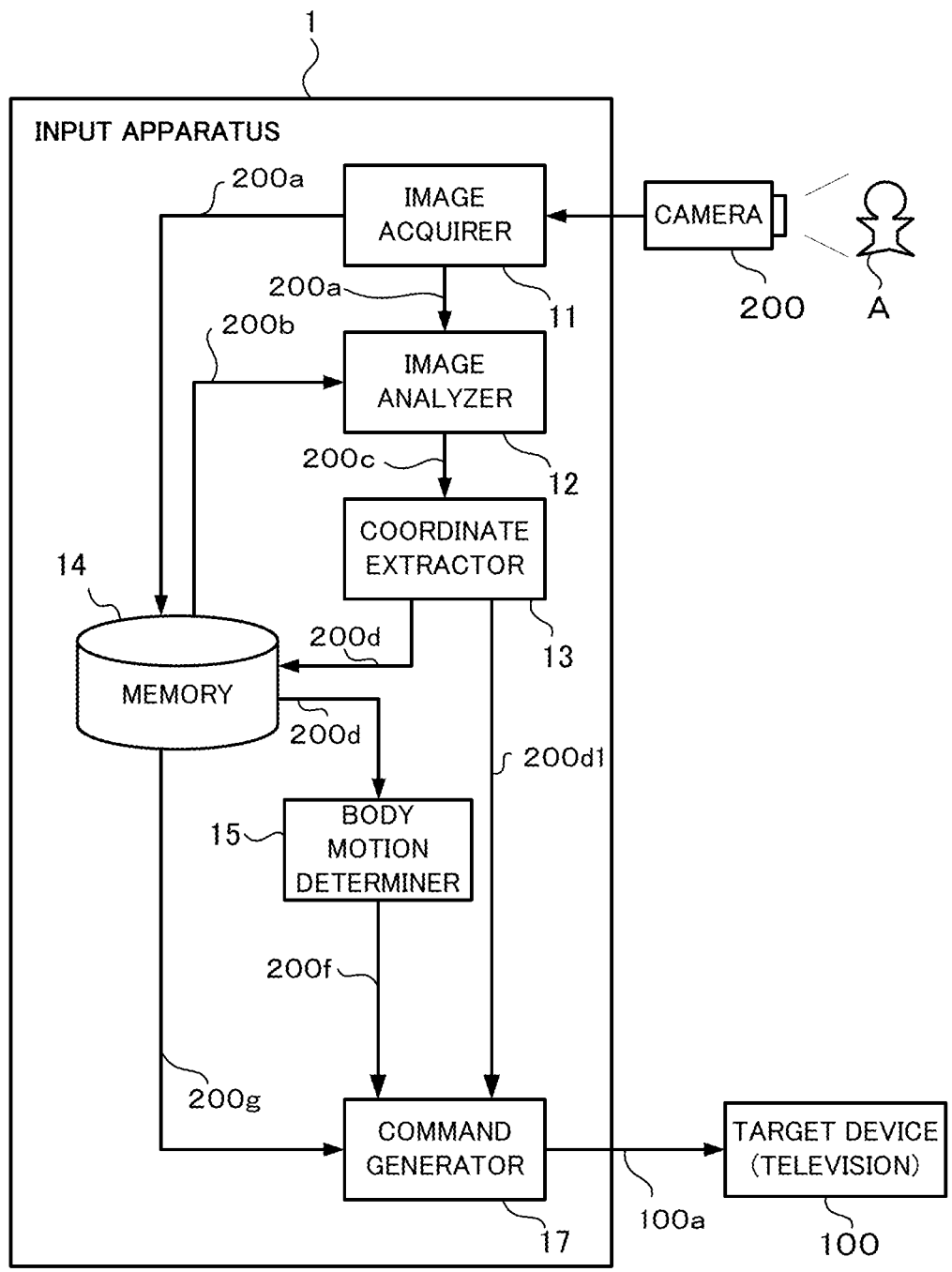
FIG. 8 is a block diagram illustrating a modified example of the example structure of the input apparatus illustrated in FIG. 1.

Further, the start coordinate detector 16 may, instead of detecting the coordinates of the feature points, receive information 200d1 representing coordinates of the feature points from the coordinate extractor 13 as shown in FIG. 8.

Figure 9:
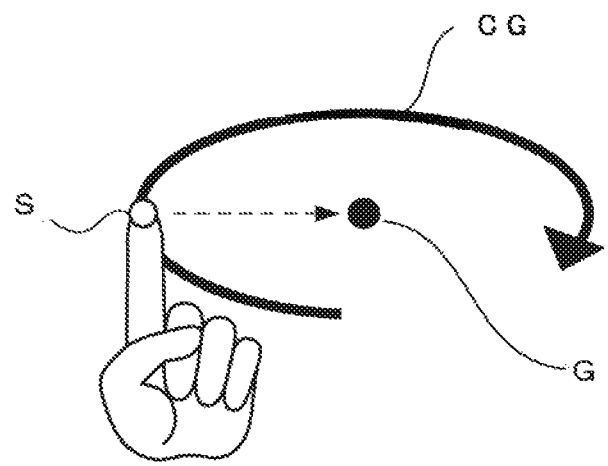
FIG. 9 is a diagram illustrating a modified example of the circle gestures illustrated in FIGS. 3A to 3D.

Still further, in the aforementioned embodiment, the circular shapes are trajectory shapes of the circle gestures CG. Alternatively, the trajectory shapes may be ovals as shown in FIG. 9. In this case, drawing of ovals is facilitated by setting the tip of an index finger of a hand as the start coordinates S and the moving direction of the hand as the direction of the major axis of the oval. Since the user can intuitively follow the direction of a dashed arrow shown in the figure, a command that is based on the positional relationship between the point defined by the start coordinate S and the point defined by the center of gravity coordinate G can be readily specified.

Yet further, while in the aforementioned embodiment, the user's body parts, namely hands, are described as an example of moving objects that are moved by the user, the moving objects may be object operated by the user such as pens or penlights instead of hands. Still further, while the points defined by start coordinates S that represent the start points of trajectories are described as an example of coordinates of the specific points the specific points may be, in addition to the start points of trajectories, arbitrary midpoints located between the start points and the end points of the trajectories, or the end points of the trajectories. In addition, while the command information 100a is described as an example of information for controlling the devices 100, when, for example, the devices 100 have displaying function, the controlling information may be display information such as text information, numerical information, or image information instead of the command information 100a.

Figure 10:
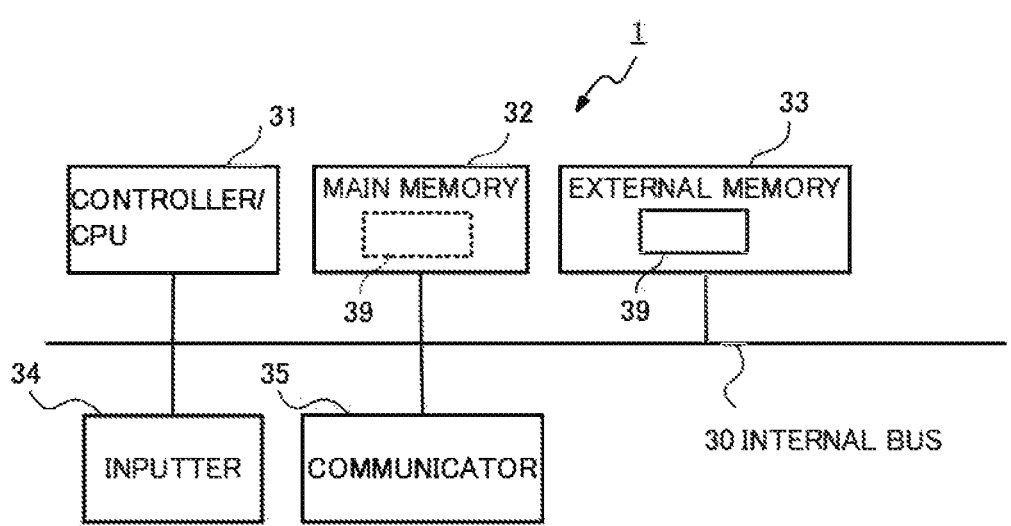
FIG. 10 is a block diagram illustrating an example hardware configuration of the input apparatus according to the embodiment.

FIG. 10 is a block diagram showing an example hardware configuration of the input apparatus according to this embodiment.

A controller 31 is constituted by a central processing unit (CPU) and the like, and in accordance with a control program 39 stored in an external memory 33, executes respective processes of the image analyzer 12, the coordinate extractor 13, the body motion determiner 15, the start coordinate detector 16, and the command generator 17.

A main memory 32 is constituted by a random-access memory (RAM) and the like, and loads therein the control program 39 that is stored in the external memory 33, and is utilized as a work area for the controller 31.

The external memory 33 is constituted by a non-volatile memory such as a flash memory, a hard disk, a digital versatile disc random-access memory (DVD-RAM), or a digital versatile disc rewritable (DVD-RW), and stores in advance programs causing the controller 31 to execute the processes of the input apparatus 1, and supplies, to the controller 31, data that is stored in these programs in accordance with instructions from the controller 31, and stores data supplied from the controller 31. The memory 14 is constituted by the external memory 33.

An inputter 34 is constituted by either a serial interface or a parallel interface. When the input apparatus 1 is connected to the camera 200, the inputter 34 is connected to the camera 200 to serve as the image acquirer 11. Note that when the camera 200 is built in the input apparatus 1, the camera 200 is employed instead of the inputter 34.

A communicator 35 is constituted by a network end apparatus or a wireless communication apparatus to connect to a network and a serial interface or a local area network (LAN) interface to connect to them, and serves as the command generator 17.

Respective processes of the image acquirer 11, the image analyzer 12, the coordinate extractor 13, the body motion determiner 15, the start coordinate detector 16, and the command generator 17 shown in FIG. 1 are executed by having the control program 39 to utilize the controller 31, the main memory 32, the external memory 33, the inputter 34, and the communicator 35 as resources.

Further, the hardware configuration and flowchart described above are mere examples, and can be arbitrarily modified and revised.

A part constituted by the controller 31, the main memory 32, the external memory 33, an internal bus 30 and the like that is a primary executor of the control processes can be realized by utilizing a normal computer system without relying on a customized special system. A computer program for executing the aforementioned operations may be stored in, for example, a computer readable non-transitory recording medium (flexible disc, CD-ROM, DVD-ROM, or the like), distributed and installed on the computer to realize the input apparatus 1 that executes the aforementioned processes. In addition, the computer program may be stored in a memory device of a server device on a communication network such as the Internet, and may be downloaded to a normal computer system to constitute the input apparatus 1.

Further, when the functions of the input apparatus 1 is realized by a combination of actions of an OS and application programs or by cooperative actions of the OS and the application programs, only the application programs portion may be stored in a recording medium or a memory apparatus.

Still further, the computer program may be superimposed on a carrier wave and distributed via communication network. The computer program may be, for example, posted on a bulletin board system (BBS) on the communication network, and distributed via the network. Thus, by activating and running this computer program under the control of the OS like other application programs, a configuration capable of executing the aforementioned processes can be realized.

All or some parts of the aforementioned embodiment can be described as supplementary notes below, but the present disclosure is not limited by following supplementary notes.

(Supplementary Note 1)

An input apparatus that generates information for controlling devices based on a user's motions characterized by comprising:

an image acquiring means that acquires images;

an image analyzing means that analyzes the images acquired by the image acquiring means and extracts image areas representing moving objects that are moved by the user;

a coordinate extracting means that extracts, from the image areas representing the moving objects extracted by the image analyzing means, coordinates of predefined points of the moving objects and generates motion information representing trajectories of motions of the moving objects;

a motion determining means that determines, based on the motion information, whether or not predetermined motions are performed and detects, when determined that the predetermined motions are performed, center coordinates of shapes formed by trajectories of the predetermined motions;

a coordinate detecting means that detects, based on the motion information, specific coordinates on the trajectories of the predetermined motions; and an information generating means that generates, based on positional relationships between points defined by the center coordinates and points defined by the specific coordinates, information for controlling the devices.

(Supplementary Note 2)

The input apparatus according to Supplementary Note 1 characterized in that the moving objects are either body parts of the user or objects controlled by the user.

(Supplementary Note 3)

The input apparatus according to Supplementary Note 1 or 2 characterized in that the points defined by the specific coordinates are any one of start points of the trajectories, midpoint of the trajectories, or end points of the trajectories.

(Supplementary Note 4)

The input apparatus according to any one of Supplementary Notes 1 to 3 characterized in that the information are command information for controlling the devices.

(Supplementary Note 5)

The input apparatus according to any one of Supplementary Notes 1 to 4 characterized by further comprising:

a memorizing means storing an information correspondence table that associates the positional relationships between the points defined by the center coordinates and the points defined by the specific coordinates with the information for controlling the devices, wherein the information generating means checks the center coordinates detected by the motion determining means and the specific coordinates detected by the coordinate detecting means with the information correspondence table to specify the corresponding information and generates the information that are specified.

(Supplementary Note 6)

The input apparatus according to Supplementary Note 5 characterized in that, when the coordinate detecting means detects no coordinate of the predetermined motions, the information generating means checks the center coordinates of the shapes formed by the trajectories of the predetermined motions detected by the motion determining means and the specific coordinates of the predetermined motions that are previously detected by the coordinate detecting means with the information correspondence table to specify the corresponding information and generates the information that are specified.

(Supplementary Note 7)

The input apparatus according to Supplementary Note 5 characterized in that:

the predetermined motions are motions that draw closed trajectories;

the information correspondence table associates the positional relationships between the points defined by the center coordinates and the points defined by the specific coordinates, directions of trajectories of the predetermined motions, and the information for controlling the devices with one another;

the motion determining means further detects, when determined that the predetermined motions are performed, directions of the trajectories of the predetermined motions; and the information generating means checks the center coordinates, the specific coordinates, and the directions of trajectories of the predetermined motions with the information correspondence table to specify the corresponding information and generates the information that are specified.

(Supplementary Note 8)

The input apparatus according to any one of Supplementary Notes 1 to 7 characterized in that the center coordinates are centers of gravity coordinates of figures surrounded by the trajectories.

(Supplementary Note 9)

A device that includes a function unit for executing functions and generates information for executing the functions based on a user's motions characterized by comprising:

an image acquiring means that acquires images;

an image analyzing means that analyzes the images acquired by the image acquiring means and extracts image areas representing moving objects moved by the user;

a coordinate extracting means that extracts, from the image areas representing the moving objects extracted by the image analyzing means, coordinates of predefined points of the moving objects and generates motion information representing trajectories of motions of the moving objects;

a motion determining means that determines, based on the motion information, whether or not predetermined motions are performed and detects, when determined that the predetermined motions are performed, center coordinates of shapes formed by the trajectories of the predetermined motions;

a coordinate detecting means that detects, based on the motion information, specific coordinates on the trajectories of the predetermined motions;

an information generating means that generates the information for executing the functions based on positional relationships between points defined by the center coordinates and points defined by the specific coordinates.

(Supplementary Note 10)

The device according to Supplementary Note 9 characterized by further including:

a memorizing means for storing an information correspondence table that associates positional relationships between the points defined by center coordinates and the points defined by specific coordinates with information for executing the functions, wherein the information generating means checks the center coordinates and the specific coordinates with the information correspondence table to specify the corresponding information and generates the information that are specified.

(Supplementary Note 11)

An input method characterized by comprising:

an image acquiring step for acquiring images;

an image analyzing step for analyzing the images acquired in the image acquiring step and extracting image areas representing moving objects that are moved by a user;

a coordinate extracting step for extracting, from the image areas representing the moving objects extracted in the image analyzing step, coordinates of predefined points of the moving objects and generating motion information representing trajectories of motions of the moving objects;

a motion determining step for determining, based on the motion information, whether or not predetermined motions are performed and detecting, when determined that the predetermined motions are performed, center coordinates of shapes formed by trajectories of the predetermined motions;

a coordinate detecting step for detecting, based on the motion information, specific coordinates on the trajectories of the predetermined motions; and an information generating step for generating, based on positional relationships between points defined by the center coordinates and points defined by the specific coordinates, information for controlling devices.

(Supplementary Note 12)

The input method according to Supplementary Note 11 characterized by further including:

a memorizing step for storing an information correspondence table that associates positional relationships between the points defined by center coordinates and the points defined by specific coordinates with information for executing the functions, wherein, in the information generating step, checks the center coordinates and the specific coordinates with the information correspondence table to specify the corresponding information and generating the information that are specified.

(Supplementary Note 13)

A non-transitory computer readable recording medium characterized by storing a program for causing a computer to function as:

an image acquiring means that acquires images;

an image analyzing means that analyzes the images acquired by the image acquiring means and extracts image areas representing moving objects that are moved by a user;

a coordinate extracting means that extracts, from the image areas representing the moving objects extracted by the image analyzing means, coordinates of predefined points of the moving objects and generates motion information representing trajectories of motions of the moving objects;

a motion determining means that determines, based on the motion information, whether or not predetermined motions are performed and detects, when determined that the predetermined motions are performed, center coordinates of shapes formed by trajectories of the predetermined motions;

a coordinate detecting means that detects, based on the motion information, specific coordinates on the trajectories of the predetermined motions; and an information generating means that generates, based on positional relationships between points defined by the center coordinates and points defined by the specific coordinates, information for controlling devices.

(Supplementary Note 14)

The non-transitory computer readable recording medium according to Supplementary Note 13 characterized by storing the program for causing the computer to function as:

a memorizing means for storing an information correspondence table that associates positional relationships between the points defined by center coordinates and the points defined by specific coordinates with information for executing the functions, wherein the information generating means checks the center coordinates and the specific coordinates with the information correspondence table to specify the corresponding information and generates the information that are specified.

Note that the foregoing embodiment is meant only to illustrate a specific embodiment of the present disclosure and is not intended to limit the scope of the present disclosure. It is apparent that the present disclosure may be practiced with variations, further applications, and improvements by choice without departing from the scope of the present disclosure set forth in the claims.

The present application claims the benefit of Japanese Patent Application No. 2012-180912 filed on Aug. 17, 2012. The entire specification, claims, and figures of Japanese Patent Application No. 2012-180912 are herein incorporated in this specification by reference.

REFERENCE SIGNS LIST

1 Input apparatus
11 Image acquirer
12 Image analyzer
13 Coordinate extractor
14 Memory
15 Body motion determiner
16 Start coordinate detector
17 Command generator
30 Internal bus
31 Controller
32 Main memory
33 External memory
34 Inputter
35 Communicator
39 Control program
100 Device
100a Command information
101 Function unit
200 Camera
200a Image information
200b Image information
200c Hand area information
200d Body motion information
200d1 Feature point coordinate information
200e Center of gravity coordinate information
200f Start coordinate information
200g Command correspondence table information

The invention claimed is:

1. An input apparatus that generates information for controlling devices based on a user's motions comprising:
memory storing instructions; and
at least one processor to execute the instructions to:
acquire images;
analyze the acquired images and extract image areas representing moving objects that are moved by the user;
extract, from the extracted image areas representing the moving objects, coordinates of predefined points of the moving objects and generate motion information representing trajectories of motions of the moving objects;
determine, based on the motion information, whether or not predetermined motions are performed and detect, when determined that the predetermined motions are performed, center coordinates of shapes formed by trajectories of the predetermined motions;
detect, based on the motion information, specific coordinates on the trajectories of the predetermined motions;
generate, based on positional relationships between points defined by the center coordinates and points defined by the specific coordinates, information for controlling the devices by:
accessing an information correspondence table stored in the memory that associates the positional relationships between the points defined by the center coordinates and the points defined by the specific coordinates with the information for controlling the devices, and
checking the detected center coordinates and the detected specific coordinates with the information correspondence table to specify the corresponding information and generating the information that is specified;
wherein the generated information for controlling the devices is different for a first trajectory and a second trajectory, the second trajectory having the same shape and direction as the first trajectory and differing from the first trajectory in the positional relationships between the points defined by the center coordinates and the points defined by the specific coordinates.

2. The input apparatus according to claim 1, wherein the moving objects are either body parts of the user or objects controlled by the user.

3. The input apparatus according to claim 1, wherein the points defined by the specific coordinates are any one of start points of the trajectories, midpoints of the trajectories, or end points of the trajectories.

4. The input apparatus according to claim 1, wherein the information is command information for controlling the devices.

5. The input apparatus according to claim 1, wherein the at least one processor is further configured to execute the program instructions to, when no specific coordinate of the predetermined motions is detected, check the center coordinates of the shapes formed by the trajectories of the detected predetermined motions and the specific coordinates of the predetermined motions that were previously detected by the at least one processor with the information correspondence table to specify the corresponding information and generate the information that is specified.

6. The input apparatus according to claim 1, wherein the predetermined motions are motions that draw closed trajectories;
the information correspondence table associates the positional relationships between the points defined by the center coordinates and the points defined by the specific coordinates, directions of trajectories of the predetermined motions, and the information for controlling the devices with one another;
the at least one processor is further configured to detect, when determined that the predetermined motions are performed, directions of trajectories of the predetermined motions; and
the at least one processor is further configured to check the center coordinates, the specific coordinates, and directions of trajectories of the predetermined motions with the information correspondence table to specify the corresponding information and generate the information that is specified.

7. The input apparatus according to claim 1, wherein the center coordinates are centers of gravity coordinates of figures surrounded by the trajectories.

8. A device that includes a function unit for executing functions and generates information for executing the functions based on a user's motions comprising:
memory storing instructions; and
at least one processor to execute the instructions to:
acquire images;
analyze the acquired images and extract image areas representing moving objects moved by the user;
extract, from the extracted image areas representing the moving objects, coordinates of predefined points of the moving objects and generate motion information representing trajectories of motions of the moving objects;
determine, based on the motion information, whether or not predetermined motions are performed and detect, when determined that the predetermined motions are performed, center coordinates of shapes formed by trajectories of predetermined motions;
detect, based on the motion information, specific coordinates on the trajectories of the predetermined motions;
generate the information for executing the functions based on positional relationships between points defined by the center coordinates and points defined by the specific coordinates by:
accessing an information correspondence table stored in the memory that associates the positional relationships between the points defined by the center coordinates and the points defined by the specific coordinates with the information for executing the functions, and,
checking the detected center coordinates and the detected specific coordinates with the information correspondence table to specify the corresponding information and generating the information that is specified;
wherein the generated information for executing the functions is different for a first trajectory and a second trajectory, the second trajectory having the same shape and direction as the first trajectory and differing from the first trajectory in the positional relationships between the points defined by the center coordinates and the points defined by the specific coordinates.

9. An input method comprising:
an image acquiring step that acquires images;
an image analyzing step that analyzes the images acquired in the image acquiring step and extracts image areas representing moving objects that are moved by a user;
a coordinate extraction step that extracts, from the image areas representing the moving objects extracted in the image analyzing step, coordinates of predefined points of the moving objects and generates motion information representing trajectories of motions of the moving objects;
a motion determining step that determines, based on the motion information, whether or not predetermined motions are performed and detects, when determined that predetermined motions are performed, center coordinates of shapes formed by trajectories of the predetermined motions;
a coordinate detecting step that detects, based on the motion information, specific coordinates on the trajectories of the predetermined motions;
an information generating step that generates, based on positional relationships between points defined by the center coordinates and points defined by the specific coordinates, information for controlling devices, by:
accessing an information correspondence table stored in a memory that associates the positional relationships between the points defined by the center coordinates and the points defined by the specific coordinates with the information for controlling the devices, and
checking the detected center coordinates and the detected specific coordinates with the information correspondence table to specify the corresponding information and generating the information that is specified;
wherein the generated information for controlling the devices is different for a first trajectory and a second trajectory, the second trajectory having the same shape and direction as the first trajectory and differing from the first trajectory in the positional relationships between the points defined by the center coordinates and the points defined by the specific coordinates, is generated as information for controlling the devices.

10. A non-transitory computer readable recording medium storing a program for causing a computer to:
acquire images;
analyze the acquired images and extract image areas representing moving objects that are moved by the user;
extract, from the extracted image areas representing the moving objects, coordinates of predefined points of the moving objects and generate motion information representing trajectories of motions of the moving objects;
determine, based on the motion information, whether or not predetermined motions are performed and detect, when determined that the predetermined motions are performed, center coordinates of shapes formed by trajectories of the predetermined motions;
detect, based on the motion information, specific coordinates on the trajectories of the predetermined motions;
generate, based on positional relationships between points defined by the center coordinates and points defined by the specific coordinates, information for controlling the devices by:

accessing an information correspondence table stored in the memory that associates the positional relationships between the points defined by the center coordinates and the points defined by the specific coordinates with the information for controlling the devices, and checking the detected center coordinates and the detected specific coordinates with the information correspondence table to specify the corresponding information and generating the information that is specified;

wherein the generated information for controlling the devices is different for a first trajectory and a second trajectory, the second trajectory having the same shape and direction as the first trajectory and differing from the first trajectory in the positional relationships between the points defined by the center coordinates and the points defined by the specific coordinates.

* * * * *